United States Patent [19]

Yoshino

[11] Patent Number: 4,869,558
[45] Date of Patent: Sep. 26, 1989

[54] DEVICE FOR TESTING BRAKE FLUID PRESSURE CIRCUIT IN ANTI-LOCK CONTROL SYSTEM

[75] Inventor: Masato Yoshino, Itami, Japan
[73] Assignee: Sumitomo Electric Industries, Ltd., Osaka, Japan
[21] Appl. No.: 251,093
[22] Filed: Sep. 29, 1988

[30] Foreign Application Priority Data

Sep. 30, 1987 [JP] Japan .................. 62-248463

[51] Int. Cl.$^4$ ................................. B60T 8/88
[52] U.S. Cl. .................. 303/92; 303/DIG. 3; 303/DIG. 4; 303/116
[58] Field of Search .......... 303/DIG. 3, DIG. 4, 303/92, 10–11, 100, 116, 12, 114, 113, 119; 340/52 C; 188/151 A, 1.11; 73/39, 121; 60/545, 547.1

[56] References Cited

U.S. PATENT DOCUMENTS

| | | | |
|---|---|---|---|
| 3,948,568 | 4/1976 | Leiber | 303/92 |
| 4,357,054 | 11/1982 | Leiber | 303/116 X |
| 4,462,642 | 7/1984 | Leiber | 303/116 X |
| 4,478,461 | 10/1984 | Leiber | 303/92 |
| 4,484,784 | 11/1984 | Leiber | 303/92 |
| 4,555,144 | 11/1985 | Belart et al. | 303/92 |
| 4,728,156 | 3/1988 | Burgdorf et al. | 303/DIG. 4 X |
| 4,753,492 | 6/1988 | Leiber et al. | 303/92 |

FOREIGN PATENT DOCUMENTS 2158905 11/1985 United Kingdom ......... 303/DIG. 4

Primary Examiner—Douglas C. Butler
Attorney, Agent, or Firm—Wenderoth, Lind & Ponack

[57] ABSTRACT

A testing device tests the brake fluid pressure circuit in an antilock control system for a motor vehicle. The testing device has a pressure switch provided in the line between a pump and a pressure accumulator in the brake fluid pressure circuit and a pressure switch detection adapted to give ON signals after the pressure indication of the pressure switch has risen above a predetermined point and give OFF signals after it has decreased below a predetermined point. If the signals fail to change from ON to OFF within a given time after issuing a command to release the pressure in the accumulator and if they fail to change from OFF to ON within a given time after issuing a command to pressurize the accumulator, the circuit is judged to be in an abnormal state.

1 Claim, 3 Drawing Sheets

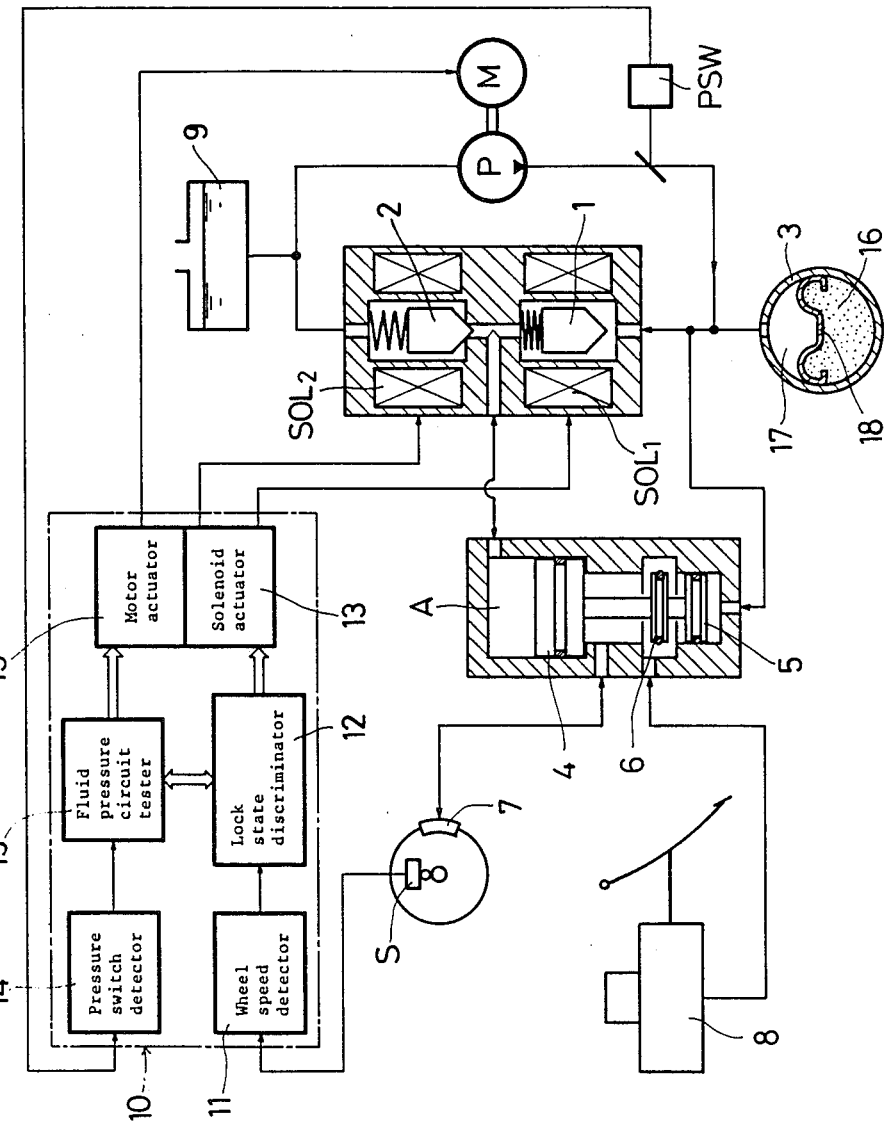
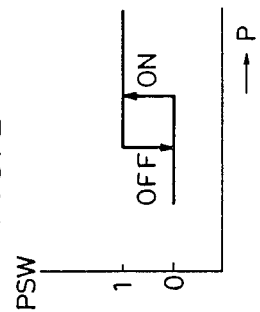

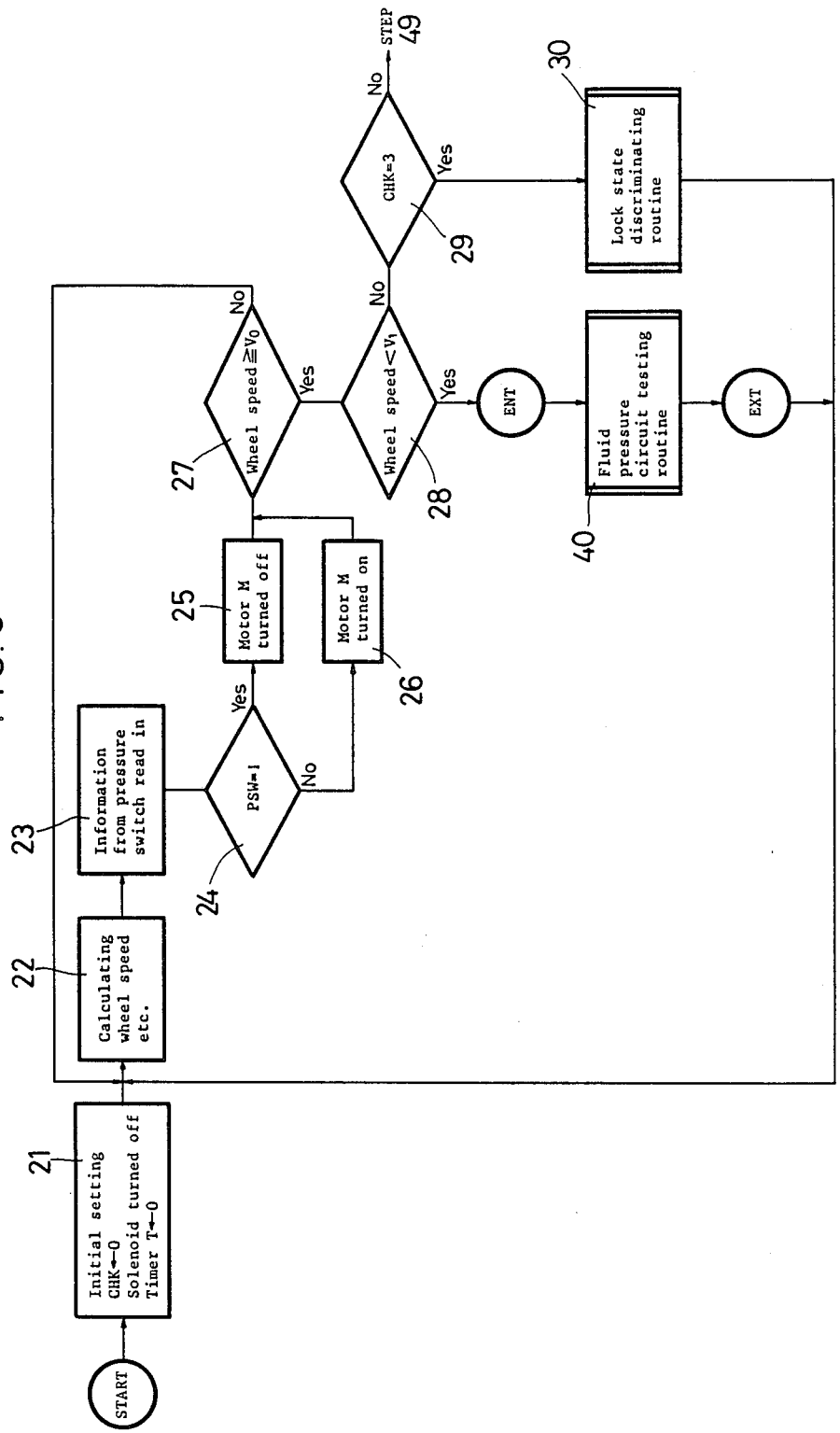

DEVICE FOR TESTING BRAKE FLUID PRESSURE CIRCUIT IN ANTI-LOCK CONTROL SYSTEM

The present invention relates to a testing device for checking a brake pressure circuit in an antilock control system for an automobile.

The brake fluid circuit in the antilock control system includes solenoid valves, a pump and a motor. As a prior art method, these parts are checked by the detection of an electrical disconnection or short-circuit. However such an electrical testing method is not able to detect certain mechanical breakdowns, such as the breakage of a shaft coupling the motor to the pump.

Such a mechanical breakdown of the pump or the motor can be detected e.g. from the fact that the pressure from the pressure source fails to return to its original level after it has dropped due to the actuation of the antilock system, even though the pump and motor are driven for a predetermined period of time thereafter. With this method, however, the breakdown of parts is left undetected until the loss of pressure actually occurs.

An object of the present invention is to provide a testing device which is capable of checking in a reliable manner whether the solenoids, pump, motor and pressure switch in the circuit are functioning normally.

In accordance with the present invention, there is provided a device for testing a brake fluid pressure circuit in an antilock control system for a motor vehicle, comprising a pressure switch provided in a line between a pump and a pressure accumulator in the brake fluid pressure circuit; a pressure switch detector means adapted to give ON signals after the pressure indication of the pressure switch has risen above a predetermined point and OFF signals after the pressure indication has decreased below a predetermined point; and means for judging whether or not the signals supplied from the detector means have changed from ON to OFF within a predetermined period of time after issuing a command to release the pressure in the pressure accumulator and whether or not the signals have changed from OFF to ON within a predetermined period of time after issuing a command to store pressure to the accumulator.

When the pressure accumulator is released from pressure accumulation, the pressure switch will detect a drop in pressure to cause the pressure switch detector means to switch its output signal from ON to OFF within a sufficient time for the pressure to drop. Thus, it is judged that the brake fluid pressure circuit is working normally. If the output signal fails to switch from ON to OFF, it is judged that at least one of the parts in the fluid pressure circuit has broken down.

On the other hand, when the accumulator is being pressurized, the signal should switch from OFF to ON within a predetermined time if the fluid pressure circuit is in a normal state. If the signal does not change over, it is judged that at least one of the parts have broken down.

According to the present invention, a pressure switch is arranged in the line between the pump and the accumulator to detect a pressure drop caused by pressure relief or a pressure rise caused by pressure accumulation. Thus, any abnormality in the performance of the pump, the motor or the accumulator can be detected. Further, since the checkup is carried out before the antilock system is put into operation, the safety of driving can be confirmed beforehand.

Other features and objects of the present invention will become apparent from the following description taken with reference to the accompanying drawings, in which:

FIG. 1 is a schematic view of the testing device according to the present invention;

FIG. 2 is a graph showing how the pressure switch turns on and off;

FIG. 3 is a flow chart showing the relationship between the testing device for the fluid pressure circuit and the lock state discriminator.

Figure 4:
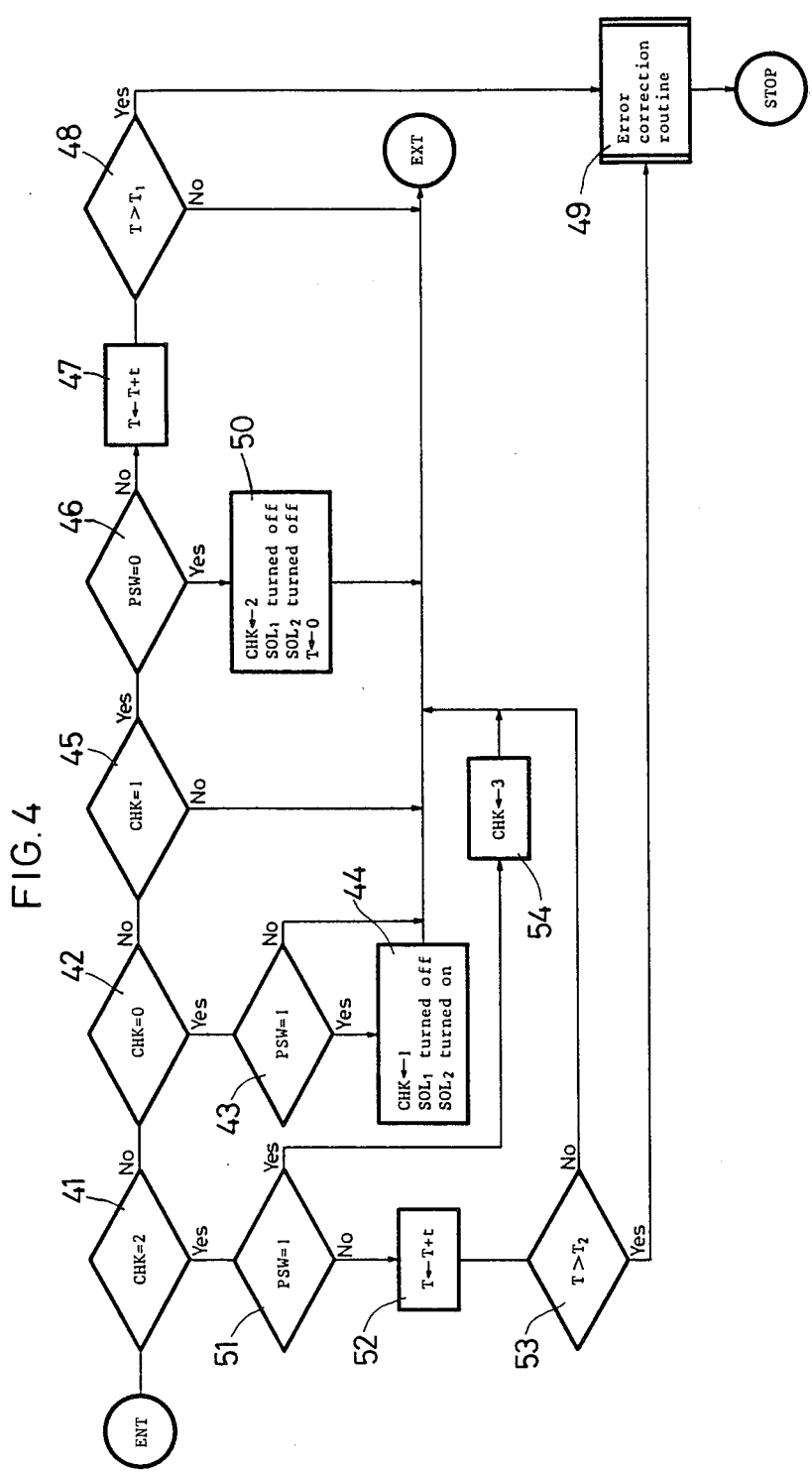
FIG. 4 is a flow chart showing the test procedure of the testing device.

FIG. 1 schematically shows how the antilock control system according to the present invention works. A wheel speed sensor S provided at each wheel output AC signals proportional to the wheel speed and a wheel speed detector 11 in an electronic control unit 10 converts the AC signals into pulse signals. The number of pulses is counted, binary-coded, and fed to a lock state discriminator 12.

The lock state discriminator 12 calculates the slip speed (estimated vehicle speed—wheel speed) and the deceleration on the basis of the wheel speed signals and compare the values thus obtained with a threshould value to determine whether the wheels are on the way to lock or recovering from lock. Then based upon the result, it issues a command to increase or decrease the braking pressure. A command to hold the braking pressure may be interposed while the pressure increase or pressure decrease command is being given.

In response to these commands, a solenoid actuator 13 opens or closes valves 1 and 2 by energizing or deenergizing solenoids SOL1 and SOL2. The following Table 1 shows the relationship between the position of the solenoids and the opening and closing of the valves.

TABLE I

|  |  | SOL1 VALVE1 | SOL2 VALVE2 |
|---|---|---|---|
| ANTI-LOCK CONTROL | PRESSURE INCREASE | OFF OPEN | OFF CLOSE |
|  | PRESSURE HOLD | ON CLOSE | OFF CLOSE |
|  | PRESSURE REDUCTION | ON CLOSE | ON OPEN |
| TEST OF FLUID PRESSURE CIRCUIT | CHK1 | OFF OPEN | ON OPEN |
|  | CHK2 | OFF OPEN CLOSE | OFF |

According as the valves 1 and 2 are opened and closed, the pressure accumulated in a pressure accumulator 3 by a pump P acts on an expander piston 4 and a piston 5 so as to move a cutoff valve 6, thus establishing or cutting off the communication between a wheel cylinder 7 and a master cylinder 8 and increasing or decreasing the volume of a cylinder chamber A (defined at the opposite side of the piston 4). The braking pressure is thus increased and decreased. In FIG. 1, numeral 9 represents a reservoir and letter M does a motor for driving the pump P.

A pressure switch PSW is provided in a line between the pump P and the accumulator 3. The output signals of the pressure switch PSW are applied to a pressure switch detector 14 in the electronic control unit 10. If as shown in FIG. 2 the pressure switch is of the type which is adapted to give ON signals after the pressure has risen above a predetermined point and transmit OFF signals after it has decreased below a predetermined point, the detector 14 may be a mere interface circuit. If the pressure switch PSW is an ordinary pressure gauge, the detector 14 should include a circuit or a program adapted to give ON signals after the pressure has risen above a predetermined point and OFF signals after it has decreased below a predetermined point.

The ON and OFF signals from the detector means 14 are fed to a fluid pressure circuit tester 15, which then commands a solenoid actuator 13 to energize or deenergize the solenoids SOL1 and SOL2 and commands a motor actuator 13' to start or stop the motor M based upon a logic which will be described later.

Next, the relation between the fluid pressure circuit tester 15 and the lock state discriminator 12 will be described.

As shown in FIG. 3, the system is first initialized in Step 21. The initialization includes switching off the solenoids SOL1 and SOL2, clearing a timer T, which is to be described later, and clearing a status CHK which shows the checkup state of the fluid pressure circuit.

In Step 22, the vehicle speed and the like are calculated based upon the signals from the wheel speed detector 11. In Step 23, the information from the pressure switch PS is read. In Step 24, a determination is made as to whether the pressure switch PSW is in the ON position or OFF position. In other words, a determination is made as to whether or not the pressure in the accumulator 3 (FIG. 1) has sufficiently increased (FIG. 2). If enough pressure is accumulated (which is expressed as PSW=1), the motor M is switched off to stop the pump P in Step 25. If the pressure is insufficient (PSW=0), the pump is actuated in Step 26.

Further, in Steps 27 and 28 a determination is made as to whether the vehicle speed is over the initial speed V0 (more than zero) and not more than a predetermined speed V1 where the antilock control is to be actuated. If it is, the program will enter into a test routine 40 for the fluid pressure circuit. One cycle of routine shown in FIG. 4 starts at ENT and ends at EXT. If the vehicle speed is over V1, it is determined in Step 29 whether the indication of the status CHK is at 3, which means that the checkup is complete. If it is, the program enters into a routine 30 for finding the lock state. If the indication of the status CHK is not at 3, this means that the vehicle speed has reached the antilock control start speed V1 before the checkup is complete.

FIG. 4 shows the details of the test routine 40. This routine starts with Step 41 in which it is determined whether or not the indication of the status CHK is at 2. The status CHK indicates the status of the checkup. Namely, the indication 0 shows that the checkup has not yet started, the indication 1 shows that it is in the first stage, the indication 2 shows that it is in the second stage and the indication 3 shows that it has completed normally.

In the first round of test routine 40 in which the status CHK has been cleared or set at zero in the initialization step 21 (FIG. 3), the program proceeds from Step 41 to Steps 42 and 34. If the PSW has not been turned on, the program leaves the routine 40 from the EXT to return to Step 22 (FIG. 3).

If the PSW is turned on, the status CHK is set at 1 and the solenoids SOL1 and SOL2 are turned off and on, respectively, in Step 44. Both valves 1 and 2 are thus opened (see Table 1) to bring the accumulator 3 into communication with the reservoir 9. The fluid pressure stored in the accumulator 3 will be released into the reservoir 9. In this state, the motor M is switched off.

The program will return from Step 44 to Step 22 and returns to Step 42, where the CHK is at 1. Thus, the program will enter into Step 45 and then proceed to Step 46, since the answer in Step 45 is YES.

As long as the CHK is 1, Step 46 is always executed where it is determined whether the fluid pressure in the accumulator has dropped by the abovesaid pressure relief i.e. whether the PSW has been switched off. If the answer is NO, in step 47 a timer T is counted up by t (=cycle time) which is a period of time required for the PSW to be turned off (see FIG. 2). In Step 48, it is determined whether time T1 required for PSW to turn off has elasped or not.

If the answer is YES, it is judged that PSW was not turned off even after T1 has elapsed. This means that at least one of the pressure switch, the solenoids and the valves are not normal. Thus, the program enters into an error correction routine 49 which includes the steps of switching on a warning lamp and cutting off a failsafe relay.

If the answer is NO in Step 48, the program leaves the routine 40 from EXT to return to Step 22.

If the PSW is turned back off within the predetermined time T1, this means that the first checkup is complete. Thus in the next round of routine, the program proceeds from STep 46 to Step 50 since the answer in Step 46 is now YES. In Step 50, the status CHK is changed to 2 for the second stage of checkup, the solenoid SOL2 is turned off and the timer T is cleared. In this state, the valve 2 is closed to cut off the communication between the accumulator 3 and the reservoir 9. Thus, pressure will be supplied into the accumulator by activating the motor M.

Since the PSW has been set at zero in Step 46, the answer in Step 24 will be NO. This will cause the motor M to be turned on in Step 26. The program then proceeds through Steps 27 and 28 to Step 41 of FIG. 4. The answer in Step 41 is now YES. Thus, the program enters into Step 51 where a determination is made as to whether the pressure switch PSW has detected an increase in pressure.

In Step 52, the timer T is counted up by t (cycle time) to wait for the pressure to rise. This is necessary because some time lag has to be taken into account before the pressure rises sufficiently. A determination is made in Step 53 as to whether the PSW has detected a rise in pressure within the time T2 required for the pressure to rise.

If no pressure rise is detected within the time T2, at least one of the pump P, motor M, solenoids SOL1 and SOL2 and valves 1 and 2 is judged to be not in a normal state.

In this case, Step 53 will issue an answer YES to advance the program to the error correction routine 49.

If the pressure switch PSW is turned on within the time T2, the program proceeds from Step 51 to Step 54 where the status CHK is switched to 3, and leaves the routine 40 from EXT to return to Step 22. The second stage of checkup is thus complete.

The pressure accumulator 3 may be of a spring type or a diaphgram type as shown in FIG. 1. If it is of the latter type, the gas in a pressure gas chamber 16 might permeate a diaphgram 18 to leak into an accumulator chamber 17. However, gas leaked as such can be removed from the chamber 17 when the fluid pressure is released into the reservoir 9.

What is claimed is:

1. The A device for testing a brake fluid pressure circuit in an antilock control system for a motor vehicle, the brake fluid pressure circuit having a pump, a pressure accumulator for maintaining pressure above a predetermined level, solenoids, and a reservoir, said device comprising:

a pressure switch provided between the pump and the pressure accumulator;

a pressure switch detector means, coupled to said pressure switch, for outputting a first signal when an indicated pressure level value of said pressure switch increases above a first predetermined value, and for outputting a second signal which is different from said first signal when said indicated pressure level value decreases below a second predetermined value;

a solenoid control means for causing the solenoids of the brake fluid pressure circuit to move between a first position in which the pressure accumulator is in communication with the reservoir and a second position in which the pressure accumulator is isolated from the reservoir;

a timer means adapted to start measuring time when said solenoid control means causes the solenoids to move to one of said first and second positions; and a judging means for determining in accordance with said timer means whether said pressure switch detector means has changed its output from said first signal to said second signal within a first predetermined period of time after said solenoid control means has caused the solenoids to move to said first position, and whether said pressure switch detector means has changed its output from said second signal to said first signal within a second predetermined period of time after said solenoid control means has caused the solenoids to move to said second position.

* * * * *